United States Patent
Wei et al.

(10) Patent No.: US 9,731,201 B1
(45) Date of Patent: *Aug. 15, 2017

(54) METHOD AND SYSTEM FOR FACILITATING CHANCE-BASED IN-GAME VIRTUAL ITEM DISTRIBUTION

(71) Applicant: KABAM, INC., San Francisco, CA (US)

(72) Inventors: Albert Wei, San Francisco, CA (US); David McNeill, San Francisco, CA (US); Kevin Lee, San Francisco, CA (US)

(73) Assignee: Aftershock Services, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,733

(22) Filed: Mar. 22, 2017

Related U.S. Application Data

(63) Continuation of application No. 14/252,777, filed on Apr. 15, 2014, now Pat. No. 9,610,493.

(51) Int. Cl.
| | |
|---|---|
| A63F 9/24 | (2006.01) |
| A63F 13/69 | (2014.01) |
| A63F 13/35 | (2014.01) |
| A63F 13/537 | (2014.01) |
| A63F 13/822 | (2014.01) |
| A63F 13/58 | (2014.01) |

(52) U.S. Cl.
CPC .............. *A63F 13/69* (2014.09); *A63F 13/35* (2014.09); *A63F 13/537* (2014.09); *A63F 13/58* (2014.09); *A63F 13/822* (2014.09); *A63F 2300/6036* (2013.01)

(58) Field of Classification Search
None
See application file for complete search history.

(56) References Cited

U.S. PATENT DOCUMENTS

| | | |
|---|---|---|
| 7,076,445 B1 | 7/2006 | Cartwright |
| 8,277,312 B2 | 10/2012 | Matthews |
| 2005/0026669 A1 | 2/2005 | Nelson |
| 2007/0298856 A1 | 12/2007 | Gilmore |
| 2008/0220846 A1 | 9/2008 | Okada |
| 2009/0305756 A1 | 12/2009 | Blair |
| 2011/0230251 A1 | 9/2011 | Nicely |
| 2011/0244935 A1 | 10/2011 | Matthews |
| 2013/0196732 A1 | 8/2013 | Oochi |

(Continued)

OTHER PUBLICATIONS

Status Effect URL: http://en.wikipedia.org/w/index.php?oldid=568301096 [Retrieved on Feb. 4, 2014], 3 pages.

*Primary Examiner* — Jason Yen
(74) *Attorney, Agent, or Firm* — Sheppard Mullin Richter & Hampton LLP

(57) ABSTRACT

A system and method for facilitating chance-based in-game virtual item distribution in a video game. A mini-game interface presents a mini-game to a user that has committed to a battle. Prior to instigation of the battle the user participates in a chance-based mini-game that determines awards to be distributed to the user from a set of potential awards. Benefits associated with a determined award are applied to a game entity included in a battle which is to follow the mini-game.

18 Claims, 6 Drawing Sheets

(56) References Cited

U.S. PATENT DOCUMENTS

| | | | | |
|---|---|---|---|---|
| 2014/0128148 A1* | 5/2014 | Soffin | ............... | A63F 13/00 |
| | | | | 463/25 |
| 2014/0317566 A1* | 10/2014 | Ohara | ............... | G06F 8/38 |
| | | | | 715/810 |
| 2014/0349766 A1* | 11/2014 | Kim | ............... | A63F 13/10 |
| | | | | 463/42 |
| 2015/0081535 A1* | 3/2015 | Nikolayev | ......... | G06Q 30/0209 |
| | | | | 705/40 |

\* cited by examiner

METHOD AND SYSTEM FOR FACILITATING CHANCE-BASED IN-GAME VIRTUAL ITEM DISTRIBUTION

FIELD OF THE DISCLOSURE

This disclosure relates to a system and method for facilitating chance-based in-game virtual item distribution. In implementations, the disclosure relates to such systems which use a mini-game interface.

BACKGROUND

In many conventional strategy based games users engage in battle with one another and/or with non-user entities such as computer/AI-controlled units. Status effects, or "buffs", appear in many such games. Status effects are typically temporary modifications to a game character or other entity's original set of stats that usually come into play when special powers and/or abilities (such as spells) are used, often during combat. Users can earn or purchase buffs in a variety of ways.

Some such games also integrate elements of slots/wagering type games. However, they do not allow users to obtain buffs through mechanisms that are optimal for maximizing user engagement and monetization. Accordingly, alternative approaches regarding user acquisition of buffs may enhance user engagement and retention and provide an improved experience while enhancing revenue generation.

SUMMARY

One aspect of the disclosure relates to a system for facilitating chance-based in-game virtual item distribution. In exemplary implementations, users are presented with a mini-game after committing to a battle. The mini-game by chance selects an award from a set of possible awards for the user to receive prior to the battle. Playing the mini-game may require consideration under some circumstances, for example when playing multiple times in a row or multiple times in a single day. The set of possible awards may be increased for a limited time for promotions or with payment of consideration. In other implementations, the in-game or other chance-based virtual item distribution mechanism may be triggered by commitment to some other type of action other than a battle, such as farming or mining, espionage, diplomacy, etc. The possible awards may depend on the type of action that initiates the mini-game. The system may comprise one or more processors configured to execute computer program components. The computer program components may include a game component, a user component, a chance-based battle award component, an award distribution component, a promotion component, and/or other components.

The game component may be configured to execute an instance of an online game and to implement the instance of the online game to facilitate participation in the online game by users via client computing platforms, wherein the participation by the users in the game includes providing, via the client computing platforms, requests to initiate battles in the online game involving game entities associated with and/or controlled by the users.

The user component may be configured to maintain inventories of virtual items under the control of the users, including virtual currency balances, and to store associations between the users and game entities under their control.

The chance-based battle award component may be configured to effectuate presentation to users that provide requests to initiate battles of a mini-game interface prior to commencement of such battles, such that a first user that provides a request to initiate a first battle in the online game involving a first game entity associated with and/or controlled by the first user is presented with the mini-game interface prior to commencement of the first battle. The mini-game interface may present to the users a chance-based mini-game that determines awards to be distributed to the users from a set of potential awards such that the mini-game interface presents a determination by the chance-based mini-game of a first award for the first user prior to the first battle, the set of potential awards including virtual items usable by the users in the battles that have been initiated.

In some implementations, the chance-based battle award component is further configured to give users an option to pay for additional plays of the chance-based mini-game prior to commencement of the battles, such that subsequent to determination of the first award but prior to commencement of the first battle, the first user is presented an option through the mini-game interface to play the chance-based mini-game another time in exchange for consideration. The consideration may befor example virtual currency, another virtual item, and/or real world money. In some implementations, the chance-based battle award component is further configured to give users an option to pay to improve the set of potential awards prior to presentation of the chance-based mini-game.

The award distribution component may be configured to distribute the determined awards to the users by applying the benefits associated with the virtual items in the determined awards to the game entities included in the battles such that the virtual item in the first award is applied to one or more game entities involved in the first battle.

In some implementations, the virtual item in the first award includes one or more of a status effect (i.e., a buff), a weapon, a character, a troop, equipment, a vehicle, and/or a tool. The virtual item may include one or more status effect such as increased attack damage, reduced opponent health points, increased troops, etc.

In some implementations, the mini-game interface presents the chance-based mini-game to users in the form of a slot machine.

The promotion component may be configured to improve the set of potential awards for a limited period of time.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
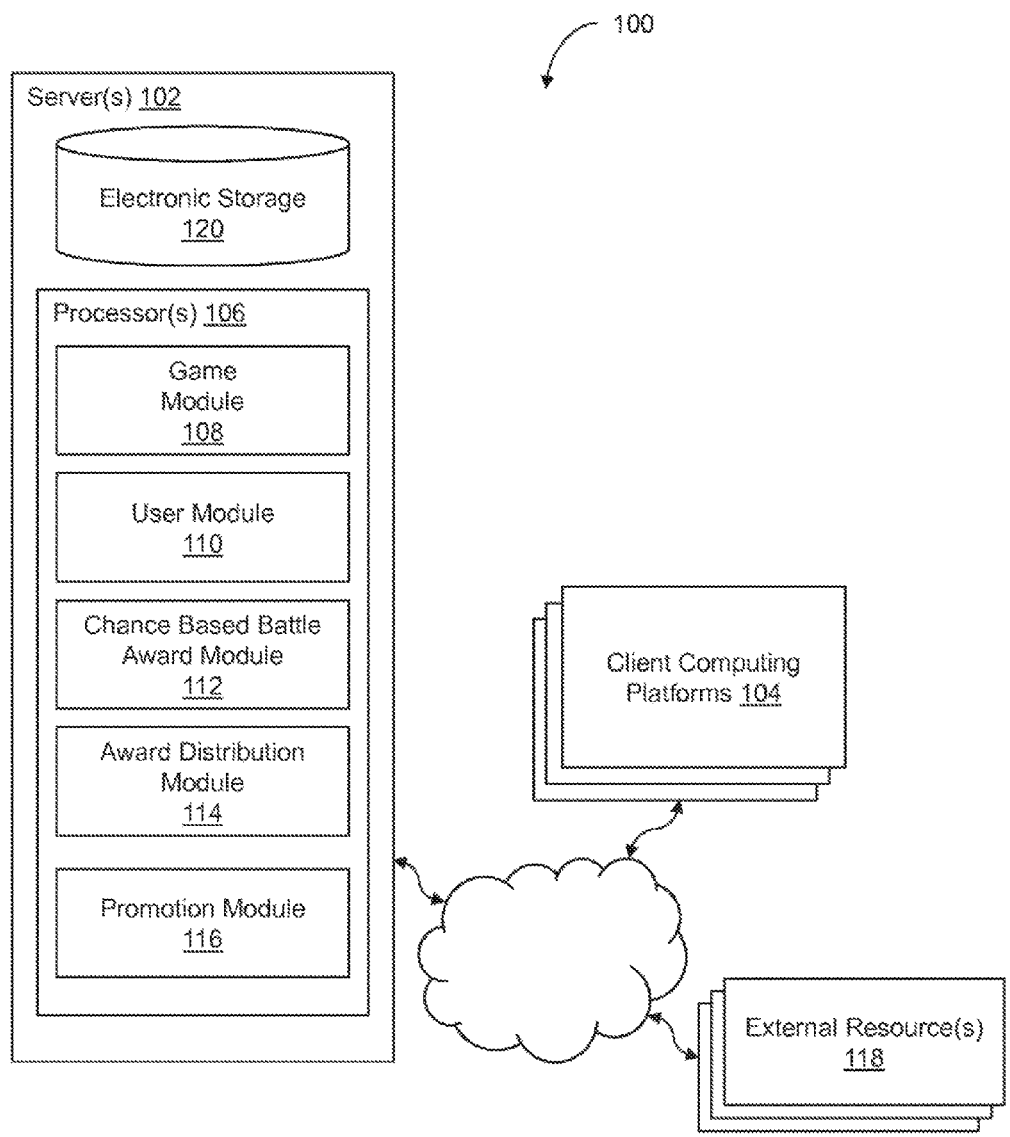
FIG. 1 illustrates a system for facilitating chance-based in-game virtual item distribution, in accordance with one or more implementations.

FIG. 1 illustrates a system 100 configured to provide a virtual space to users. System 100 is only one example of a suitable computing environment and is not intended to suggest any limitation as to the scope of use or functionality of the features described herein. In this disclosure, users in a game are offered the opportunity to gain awards for use within the game by means of chance-based in-game virtual distribution. In exemplary implementations, users are presented with a mini-game after committing to a battle. The mini-game by chance selects an award from a set of possible awards for the user to receive prior to the battle. Playing the mini-game may require consideration under some circumstances, for example when playing multiple times in a row or multiple times in a single day. The set of possible awards may be increased for a limited time for promotions or with payment of consideration. Providing the virtual space may include hosting the virtual space over a network.

In some implementations, system 100 may include a server or servers 102. The server 102 may be configured to communicate with one or more client computing platforms 104 according to a client/server architecture. The users may access system 100 and/or the virtual space via client computing platforms 104, for instance, to engage in one or more games.

The server 102 may be configured to execute one or more computer program components using one or more processors 106. The computer program components may include one or more of a game component 108, a user component 110, a chance-based battle component 112, an award distribution component 114, a promotion component 116 and/or other components.

The game component 108 may be configured to execute an instance of an online game and to implement the instance of the online game to facilitate participation in the online game by users via client computing platforms, where the participation by the users in the game includes providing, via the client computing platforms, requests to initiate battles in the online game involving game entities associated with and/or controlled by the users.

The game may be provided within a virtual space, and may include a plurality of resource types and/or maps. An instance of the virtual space may be executed by computer components to determine views of the virtual space. The views may then be communicated (e.g., via streaming, via object/position data, and/or other information) from server(s) 102 and/or other sources to client computing platforms 104 for presentation to users. The view determined and transmitted to a given client computing platform 104 may correspond to a user-controlled element. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which views of the virtual space are provided is not intended to be limiting. The virtual space may be expressed in a more limited, or rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated. The user-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102.

The instance of the virtual space and/or the online game may be persistent. That is, the online game may continue on whether or not individual users are currently logged in and/or participating in the online game. A user that logs out of the online game and then logs back in some time later may find the virtual space associated with the online game has been changed through the interactions of other users with the virtual space during the time the user was logged out. These changes may include changes to the simulated physical space, changes in the user's inventory, changes in other users' inventories, changes experienced by non-user characters, and/or other changes.

The user component 110 may be configured to access and/or manage one or more user profiles and/or user information associated with users of the system 100. The one or more user profiles and/or user information may include information stored by server 102, one or more of the client computing platforms 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, inventory information which indicates items that are in the possession of the user, a client computing platform identification associated with a user, a phone number associated with a user, details of membership of one or more alliances, associations with users and the game entities under their control and/or other information related to users. In addition, the information may include details of membership of one or more alliances.

The user component 110 may be configured to maintain inventories of virtual items under the control of the users, including virtual currency balances, and to store associations between the users and game entities under their control. The inventories may include a first inventory of virtual items under control of the first user, and when the user purchases or is awarded a virtual item, the user component may add it to the first inventory.

The chance-based battle award component 112 may be configured to effectuate presentation to users that provide requests to initiate battles of a mini-game interface prior to commencement of such battles, such that a first user that provides a request to initiate a first battle in the online game involving a first game entity associated with and/or controlled by the first user is presented with the mini-game interface prior to commencement of the first battle. The mini-game interface may present to the users a chance-based mini-game that determines awards to be distributed to the users from a set of potential awards such that the mini-game interface presents a determination by the chance-based mini-game of a first award for the first user prior to the first battle, the set of potential awards including virtual items usable by the users in the battles that have been initiated.

In some implementations, the chance-based battle award component 112 is further configured to give users an option to pay for additional plays of the chance-based mini-game prior to commencement of the battles, such that subsequent to determination of the first award but prior to commencement of the first battle, the first user is presented an option through the mini-game interface to play the chance-based mini-game another time in exchange for consideration. The consideration may be for example virtual currency, another virtual item, and/or real world money. In some implementations, the chance-based battle award component 112 is further configured to give users an option to pay to improve the set of potential awards prior to presentation of the chance-based mini-game.

For example, a user might commit to sending a certain number of its troops to attack troops stationed in a certain region of the game by another user. Once committing to the battle, a mini-game may pop up on the user's screen, offering the user a randomized opportunity to receive a virtual item that would be helpful in the battle the user has committed to. For example, the mini-game might be a slot-machine style game where the user spins the reels to randomly determine the award received. In implementations, the chance-based mini-game may be presented to the user on a variety of different occasions. The mini-game may be played prior to commencement of a battle as previously discussed. The user may be presented with an option to play or re-play the mini-game before the battle or at any other appropriate timeIn implementations, the user may request to play the mini-game at another time in return for consideration. For example, the user might pay (e.g. real or virtual currency) to play the chance-based mini-game before committing to a battle, in order to be able to take the award received from the mini-game into account when planning/selecting the battle. The user may be offered a fixed number of free plays of the mini-game in a given period, for example one free play each day, or three free plays each week, etc.

The consideration used to play the mini-game additional times may be at least one of virtual currency, another virtual item, real world money, and/or any other type of payment. The virtual items which may be awarded to the users may include one or more of a status effect (i.e., a buff), a weapon, a character, a troop, equipment, a vehicle, or a tool. A status effect in a game is a temporary modification to a game character or other entity's original set of abilities that may provide special powers and abilities, often during a battle. A buff is generally the term used for a positive status effect that gives positive powers and abilities. Buffs may include increasing the speed of a recipient, increasing the attack speed or damage, increasing the health points, increasing a recipient's perception, increasing a recipient's physical defense, healing a recipient over time or for a period of time, reducing an opponent's health points and/or any other positive effect on the user's game.

In some implementations, the mini-game is presented in the form of a slot machine interface. The slot machine may include row and columns showing a plurality of pictorial representations. These pictorial representations may have an initial arrangement, and then changing pictorial representations may be displayed as when a traditional slot machine is activated, until a final arrangement of pictorial representations is displayed which correlates to an award received. The final arrangement may be selected at random, by for example a random number generator. Certain predetermined arrangements may correspond with a winning outcome and indicate an award. A winning arrangement may comprise a line of identical pictorial representations, a matrix of matching pictorial representations, a predetermined sequence of pictorial representations, and/or any other arrangement chosen to correspond with a winning outcome. All final arrangements may result in awards, with some being more valuable than others, or some final arrangements may result in no award being received. In implementations, the look and feel of the slot machine may be changed by users and/or game providers as required.

The slot machine interface may include any number or rows and/or columns and may be formed in any shape. The slot machine interface may be operated by the user by pressing a button, by swiping a finger across a screen, by voice command and/or by any other control mechanism or action. In addition, many other chance-based mini-games are possible. In implementations, users may be able to choose between different available mini-games.

The award distribution component 114 may be configured to distribute the determined awards to the users by applying the benefits associated with the virtual items in the determined awards to the game entities included in the battles such that the virtual item in the first award is applied to one or more game entities involved in the first battle. The status effect or other award may be applied to a game entity associated with and/or controlled by the user. The game entity may be a character, object, equipment and/or any other entity in the game. In implementations, the benefits may be applied to the game entity by adding the benefit directly to the statistics of the game entity or to the inventory of the user and/or game entity, equipping the game entity with the benefit at the start of the battle, holding the benefit until the user requests it and/or any other manner of applying the benefit. For example, the determined award might carry a benefit of a 50% increase in hit points, which is applied directly to the game entity's hit point statistic for the next battle only.

The promotion component 116 may be configured to improve the set of potential awards for a limited period of time. For example, to encourage gameplay at certain dates and/or times, the promotion component may increase the value of the set of potential awards at those dates and/or times. Alternatively, users may pay consideration (e.g. virtual or real-life currency) to use a set of potential awards of increased value when playing the chance-based mini-game. In some embodiments, improving the set of potential awards may involve activating a jackpot mode where at least one of the awards in the set of potential awards is extremely valuable, for example automatically winning the battle.

In some implementations, the server 102, client computing platforms 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 118 may be operatively linked via some other communication media.

A given client computing platform 104 may include one or more processors configured to execute computer program components. The computer program components may be configured to enable an expert or user associated with the given client computing platform 104 to interface with system 100 and/or external resources 118, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information, hosts and/or providers of virtual environments outside of system 100, external entities participating with system 100, and/or other resources. In some implementations, some or all of the functionality attributed herein to external resources 118 may be provided by resources included in system 100.

Server 102 may include electronic storage 120, one or more processors 106, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 120 may comprise non-transitory storage media that electronically stores information. The electronic storage media of electronic storage 120 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 120 may store software algorithms, information determined by processor 106, information received from server 102, information received from client computing platforms 104, and/or other information that enables server 102 to function as described herein.

Processor(s) 106 is configured to provide information processing capabilities in server 102. As such, processor 106 may include one or more of a digital processor, an analog processor, a digital circuit designed to process information, an analog circuit designed to process information, a state machine, and/or other mechanisms for electronically processing information. Although processor 106 is shown in FIG. 1 as a single entity, this is for illustrative purposes only. In some implementations, processor 106 may include a plurality of processing units. These processing units may be physically located within the same device, or processor 106 may represent processing functionality of a plurality of devices operating in coordination. The processor 106 may be configured to execute components 108, 110, 112, 114, and 116. Processor 106 may be configured to execute components 108, 110, 112, 114, and 116 by software; hardware; firmware; some combination of software, hardware, and/or firmware; and/or other mechanisms for configuring processing capabilities on processor 106. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although 108, 110, 112, 114, and 116 are illustrated in FIG. 1 as being implemented within a single processing unit, in implementations in which processor 106 includes multiple processing units, one or more of components 108, 110, 112, 114, and 116 may be implemented remotely from the other components. The description of the functionality provided by the different components 108, 110, 112, 114, and 116 described below is for illustrative purposes, and is not intended to be limiting, as any of components 108, 110, 112, 114, and 116 may provide more or less functionality than is described. For example, one or more of components 108, 110, 112, 114, and 116 may be eliminated, and some or all of its functionality may be provided by other ones of components 108, 110, 112, 114, and 116. As another example, processor 106 may be configured to execute one or more additional components that may perform some or all of the functionality attributed below to one of components 108, 110, 112, 114, and 116.

Figure 2:
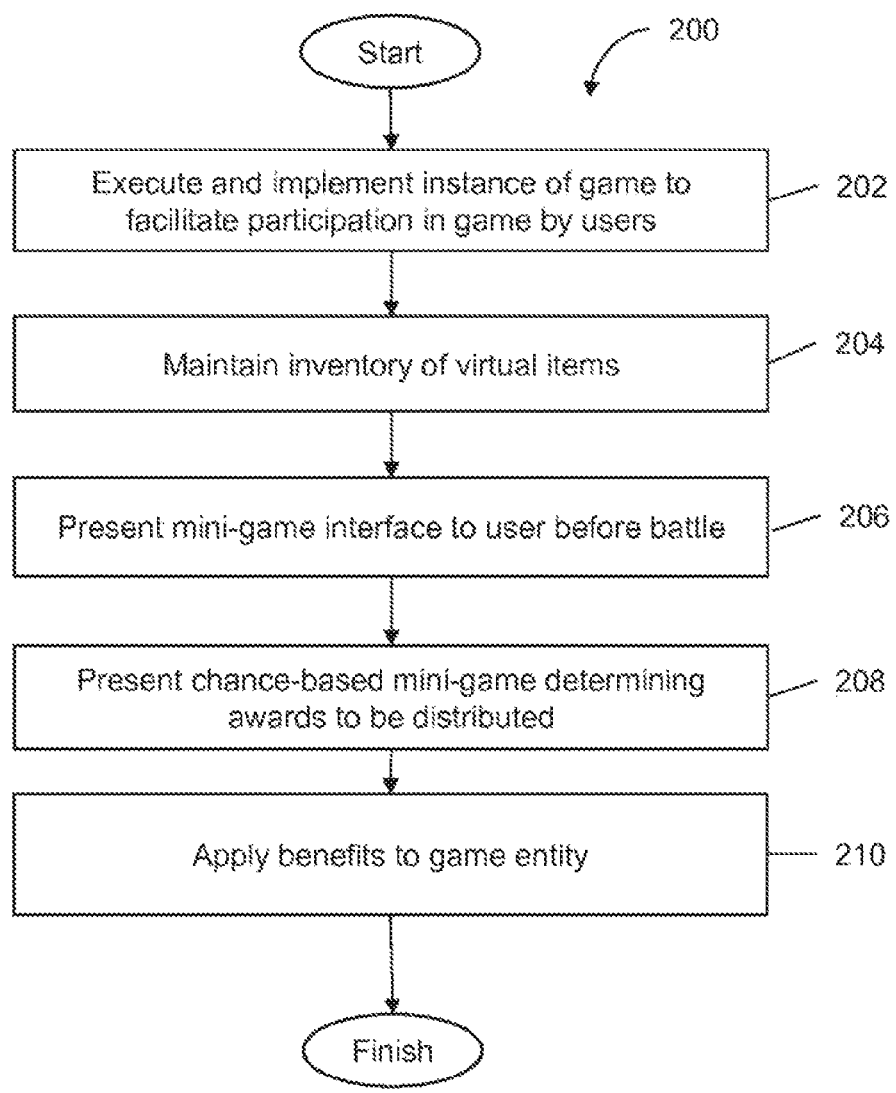
FIG. 2 illustrates a method for operating a chance-based in-game virtual item distribution process, in accordance with one or more implementations.

FIG. 2 illustrates a method for in-game calendar-based item promotion 200. The operations of the method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of an online game may be executed and implemented to facilitate participation in the game by users via client computing platforms. The participation by the users in the game may include providing, via the client computing platforms, requests to initiate battles in the online game involving game entities associated with and/or controlled by the users. Operation 202 may be performed by a game component that is the same as or similar to game component 108, in accordance with one or more implementations.

At an operation 204, an inventory of virtual items, including virtual currency balances, under the control of the users may be maintained and associations between users and game entities under their control may be stored. Operation 206 may be performed by a component that is the same as or similar to at least user component 110, in accordance with one or more implementations.

At an operation 206, a mini-game is presented to a user that has requested to initiate a battle, prior to commencement of such battle. The user may be a first user and the request to initiate the battle involve a first game entity associated with and/or controlled by the first user. Operation 206 may be performed by a component that is the same as or similar to chance-based battle award component 112, in accordance with one or more implementations.

The user may be presented with a second opportunity to play the mini-game and thus be eligible for second potential awards. The user may be required to pay a consideration for the second or any further play of the mini-game in a predetermined time period. The consideration is at least one of virtual currency, another virtual item, and real world money.

At an operation 208, the users may be presented with a chance-based mini-game that determines awards to be distributed to the users from a set of potential awards, including a first user presented with a first determined award prior to a first battle. The set of potential awards may include virtual items usable by the users in the battles that have been initiated. The mini-game may be a chance-based mini-game, such as a slot machine, that determines awards to be distributed to the users from a set of potential awards such that a determination is presented of an award for the user prior to the battle. The set of potential awards may comprise virtual items usable by the user in the battle that is to be initiated. The virtual items may include one or more of a status effect (i.e., a buff), a weapon, a character, a troop, equipment, a vehicle, or a tool. Operation 208 may be performed by a component that is the same as or similar to chance-based battle award component 112, in accordance with one or more implementations.

At an operation 210, the determined awards are distributed to the users by applying the benefits associated with the virtual items in the determined awards to the users' game entities included in the battles. Such distribution may include applying a virtual item in a first determined award to one or more game entities involved in a first battle. Thus, the virtual item awarded as a result of playing the mini-game may be used in the battle by the user through its game entity. Operation 210 may be performed by a component that is the same as or similar to award distribution component 114, in accordance with one or more implementations.

Figure 3:
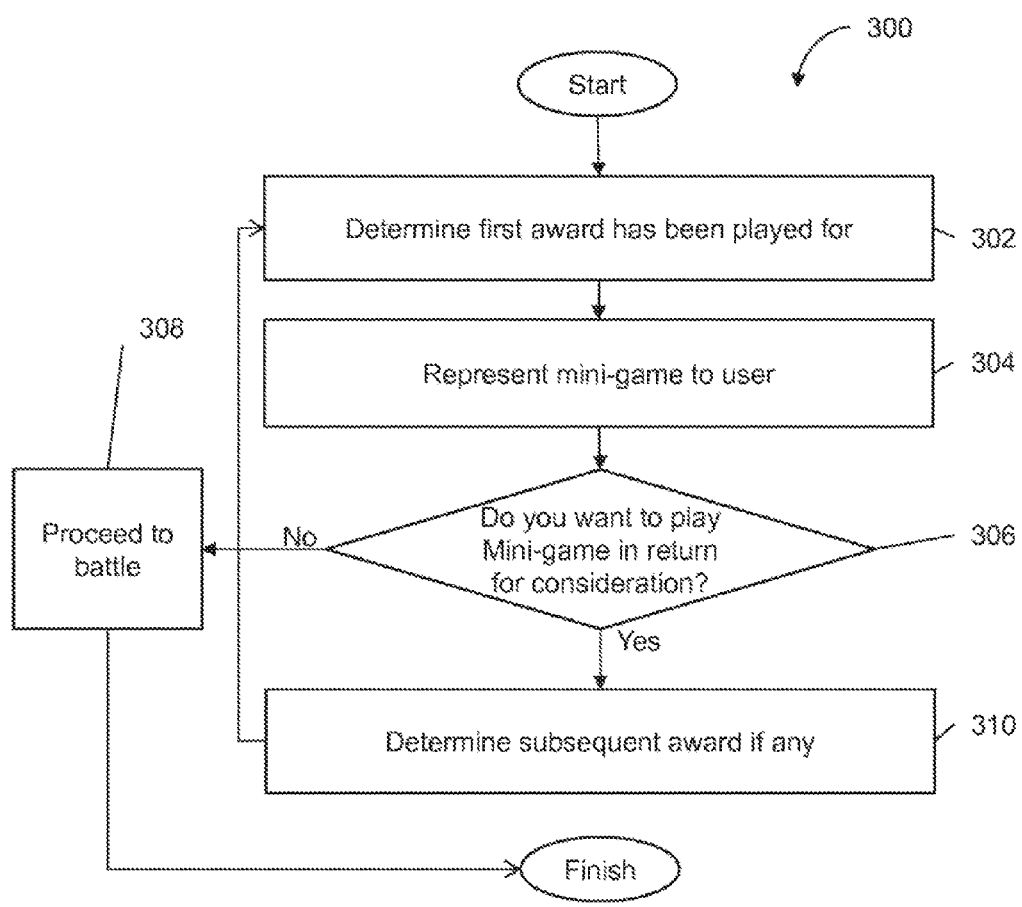
FIG. 3 illustrates a method for replaying a mini-game, in accordance with one or more implementations.

FIG. 3 illustrates a method 300 for replaying a mini-game. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

In an operation 302, a determination is made that the user has played the mini-game for at least a first time and has been considered for at least a first award. Operation 302 may be performed by a component that is the same as or similar to user component 110, in accordance with one or more implementations.

In an operation 304, the mini-game is presented to the user for a second time. Operation 304 may be performed by a component that is the same as or similar to chance-based battle award component 112, in accordance with one or more implementations.

At an operation 306, a determination is made as to whether the user wishes to purchase the opportunity to play the mini-game for a second or further time. If the user does not wish to purchase the opportunity to play the mini-game the users proceeds to the battle 308. If the user does wish to purchase the opportunity to play the mini-game, the user pays for the play by any type of payment method that is appropriate to the mini-game (e.g. virtual currency real-world currency). Operation 306 may be performed by a component that is the same as or similar to chance-based battle award component 112, in accordance with one or more implementations. Operation 308 may be performed by a component that is the same as or similar to game component 108, in accordance with one or more implementations.

At an operation 310, the mini-game is replayed and in the case of a winning outcome a second award may be distributed to the user, which may be instead of or in addition to the first award. In implementations, after operation 310 the method may return to operation 302 and offer additional opportunities to play the mini-game for additional consideration. In other implementations, the user may only receive one additional chance to play the mini-game (or any given number of attempts) after which the method proceeds to operation 308 without the opportunity for further mini-game plays. Operation 310 may be performed by components that are the same as or similar to chance-based battle component 112 and/or award distribution component 114, in accordance with one or more implementations.

Figure 4:
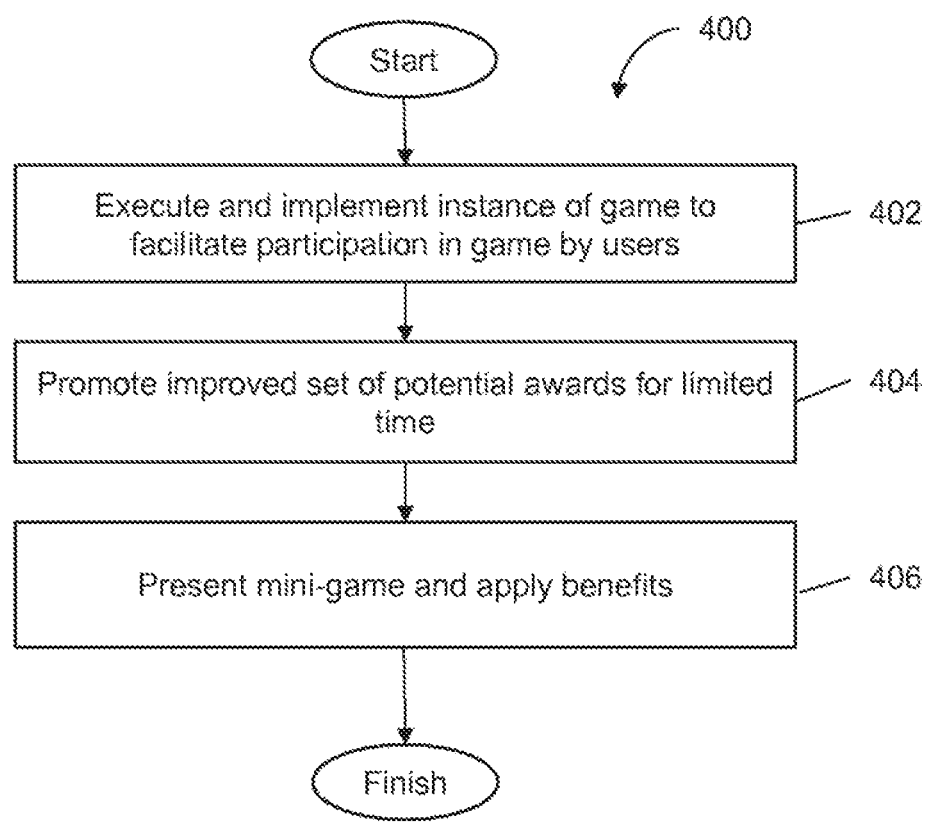
FIG. 4 illustrates a method for promoting improved awards to users, in accordance with one or more implementations.

FIG. 4 illustrates a method 400 for promoting improved awards to users. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

In an operation 402, a game instance is executed and implemented to facilitate participation in the game by users, where participation in the game includes initiation of battles by users and use of a chance-based pre-battle virtual item distribution mini-game. Operation 402 may be performed by a component that is the same as or similar to at least game component 108, and/or chance-based battle award component 112, in accordance with one or more implementations.

In an operation 404, an improved set of potential awards for distribution through the chance-based pre-battle mini-game may be offered to the users for a limited time. For example, all status effects associated with awards distributed through the mini-game might be doubled on a certain day of the week, to encourage gameplay on that day. In implementations, the limited-time improved set of awards may be triggered by payment of consideration (e.g. virtual or real-life currency) by one or more users. For example, a user might pay a certain amount of virtual currency to play the mini-game in a jackpot mode with improved awards for some number of spins and/or period of time, e.g. one spin, ten spins, one day, etc. Operation 404 may be performed by a component that is the same as or similar to at least promotion component 116, in accordance with one or more implementations.

In an operation 406, the user is presented with the mini-game interface and plays the mini-game and the award from the improved set of awards is determined and the benefits of the award are applied, substantially as discussed above. Operation 406 may be performed by components that are the same as or similar to at least chance-based battle award component 112 and/or award distribution component 114, in accordance with one or more implementations.

Figure 5:
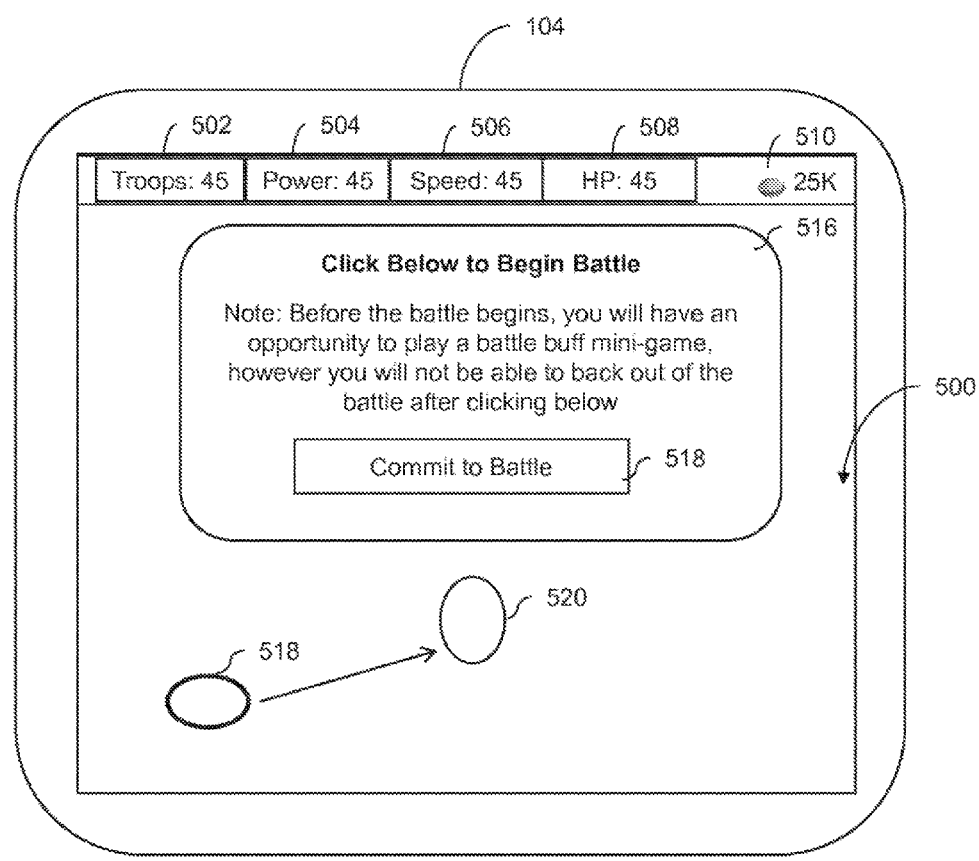
FIG. 5 illustrates a game scenario on a client computing platform that facilitates chance-based in-game virtual item distribution, in accordance with one or more implementations.

FIG. 5 illustrates a game scenario 500 on a client computing platform 104 that facilitates chance-based virtual item distribution, in accordance with one or more implementations. As shown, game entities may have statistics including number of troops 502, power 504, speed 506, and hit points (HP) 508. Additionally, users may have inventories including amounts of virtual currency 510. As shown, game entity 518, which may be for example a combat unit, has been selected and its statistics 502,504,506,508 are shown at the top of the screen. A user has directed the game entity 518 to attack second game entity 520 to initiate a battle. A battle initiation bar 516 displays a message and a battle commitment button 518 for the user to select to commit to the battle. Once the battle commitment button 518 has been selected, game scenario 600 in FIG. 6 may be realized.

Figure 6:
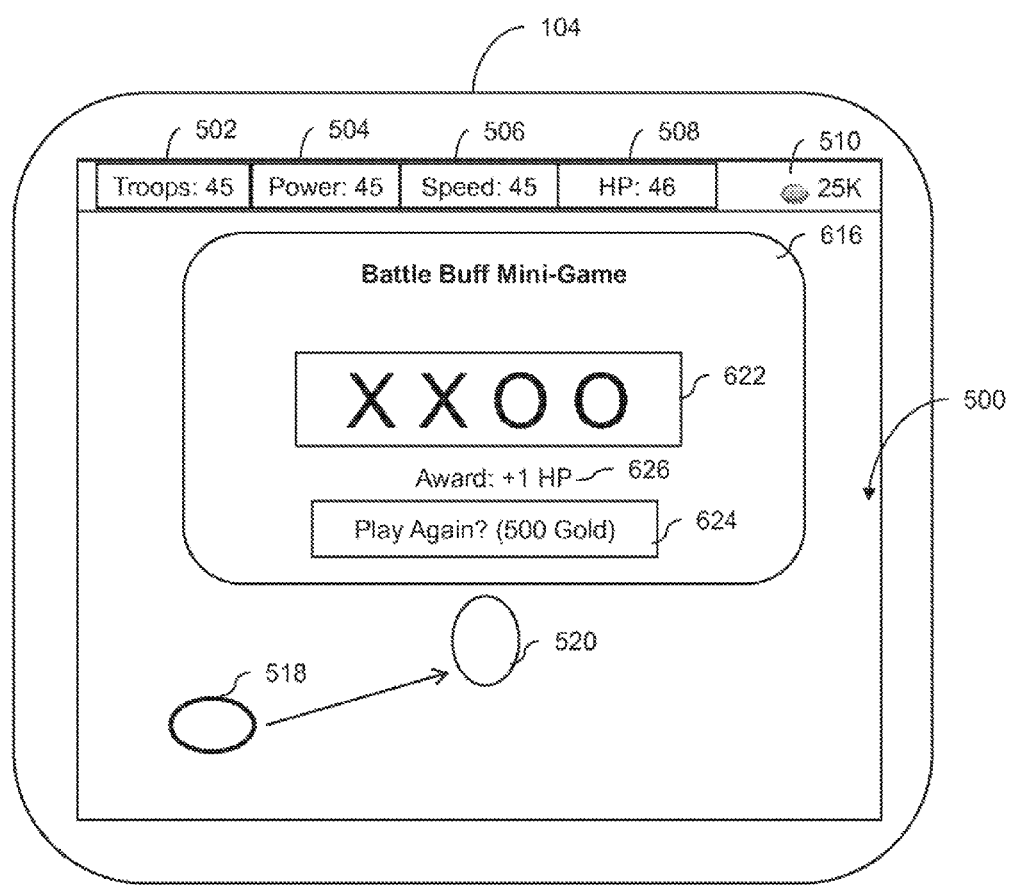
FIG. 6 illustrates a game scenario on a client computing platform that facilitates chance-based in-game virtual item distribution, in accordance with one or more implementations.

FIG. 6 illustrates a game scenario 600 on a client computing platform 104 that facilitates chance-based virtual item distribution, in accordance with one or more implementations. In this game scenario 600, the user has committed to a battle between the user's game entity 518 and second game entity 520. Battle buff mini-game bar 616 has been displayed and includes results display 622, which is similar to a slot machine. The symbols displayed in results display 622 are determined based on chance, and any types of symbols may be displayed therein. The symbols correspond to an award 626 received by the user for the battle, in this case an increase to the game entity's HP statistic. This increase has been effectuated and is reflected in HP statistic 508 for the selected game entity. Replay button 624 may be selected by the user to replay the mini-game and receive a new award, which may substitute for or be cumulative with the award 626 currently displayed. In this case, selection of the replay button 624 comes at a cost to the user, here five hundred gold, although in other implementations the cost may be some other resource, virtual item, real-life currency, etc.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating chance-based in-game virtual item distribution, the system comprising:
one or more physical computer processors configured by machine readable instructions to:
execute an instance of an online game and to implement the instance of the online game to facilitate participation in the online game by users via client computing platforms, wherein the participation by the users in the game includes providing, via the client computing platforms, requests to initiate in-game actions in the online game involving game entities associated with and/or controlled by the users;
maintain inventories of virtual items under the control of the users, including virtual currency balances, and to store associations between the users and game entities under their control;
effectuate presentation to users that provide requests to initiate in-game actions responsive to the users providing the requests to initiate battles, of a mini-game interface prior to commencement of such in-game actions such that responsive to a first user providing a request to initiate a first in-game action in the online game involving a first game entity associated with and/or controlled by the first user, the first user is presented with the mini-game interface prior to commencement of the first in-game action, the mini-game interface presenting to the users a chance-based mini-game that determines awards to be distributed to the users from a set of potential awards such that the mini-game interface presents a determination by the chance-based mini-game of a first award for the first user prior to the first in-game action, the set of potential awards comprising awards that impact gameplay in the in-game actions that have been initiated; and
effectuate presentation, to the users, of an option to pay for additional plays of the chance-based mini-game prior to commencement of the in-game actions such that subsequent to determination of the first award but prior to commencement of the first in-game action, the first user is presented an option through the mini-game interface to play the chance-based mini-game another time in exchange for consideration; and
distribute the determined awards to the users by applying impacts associated with the awards to the game entities included in the in-game actions such that an impact associated with the first award are applied to one or more game entities involved in the first in-game action.

2. The system of claim 1, wherein the first award includes one or more of a status effect (i.e., a buff), a weapon, a character, a troop, equipment, a vehicle, or a tool.

3. The system of claim 2, wherein the mini-game interface presents the chance based mini-game to users in the form of a slot machine.

4. The system of claim 1, wherein the one or more physical computer processors are further configured to give users an option to pay for additional plays of the chance-based mini-game prior to commencement of the in-game actions such that subsequent to determination of the first award but prior to commencement of the first in-game action, the first user is presented an option through the mini-game interface to play the chance-based mini-game another time in exchange for consideration.

5. The system of claim 4, wherein the consideration is at least one of virtual currency, another virtual item, and real world money.

6. The system of claim 5, wherein the consideration is real world money.

7. The system of claim 1, wherein the one or more physical computer processors are further configured to improve the set of potential awards for a limited period of time.

8. The system of claim 1, wherein the one or more physical computer processors are further configured to give users an option to pay to improve the set of potential awards prior to presentation of the chance-based mini-game.

9. The system of claim 2, wherein the impact includes a status effect comprising at least one of increased attack damage, reduced opponent health points, and increased troops.

10. A computer-implemented method for facilitating chance-based in-game virtual item distribution, the method being implemented in a computer system that includes one or more processors executing computer program components, the method comprising:
executing an instance of an online game and implementing the instance of the online game to facilitate participation in the online game by users via client computing platforms, wherein the participation by the users in the game includes providing, via the client computing platforms, requests to initiate in-game actions in the online game involving game entities associated with and/or controlled by the users;
maintaining inventories of virtual items under the control of the users, including virtual currency balances, and storing associations between the users and game entities under their control;
effectuating presentation to users that provide requests to initiate in-game actions responsive to the users providing the requests to initiate in-game actions, of a mini-game interface prior to commencement of such in-game actions such that responsive to a first user providing a request to initiate a first in-game action in the online game involving a first game entity associated with and/or controlled by the first user, the first user is presented with the mini-game interface prior to commencement of the first in-game action;
presenting to the users a chance-based mini-game that determines awards to be distributed to the users from a set of potential awards such that a determination is presented of a first award for the first user prior to the first in-game action, the set of potential awards comprising awards that impact gameplay in the in-game actions that have been initiated;
effectuate presentation, to the users, of an option to pay for additional plays of the chance-based mini-game prior to commencement of the in-game actions such that subsequent to determination of the first award but prior to commencement of the first in-game action, the first user is presented an option through the mini-game interface to play the chance-based mini-game another time in exchange for consideration; and
distributing the determined awards to the users by applying impacts associated with the awards to the game entities included in the in-game actions such that an impact associated with the first award are applied to one or more game entities involved in the first in-game action.

11. The method of claim 10, wherein the first award includes one or more of a status effect (i.e., a buff), a weapon, a character, a troop, equipment, a vehicle, or a tool.

12. The method of claim 11, further comprising presenting the chance-based mini-game to users in the form of a slot machine.

13. The method of claim 10, further comprising giving users an option to pay for additional plays of the chance-based mini-game prior to commencement of the in-game actions such that subsequent to determination of the first award but prior to commencement of the first in-game action, the first user is presented an option to play the chance-based mini-game another time in exchange for consideration.

14. The method of claim 13, wherein the consideration is at least one of virtual currency, another virtual item, and real world money.

15. The method of claim 14, wherein the consideration is real world money.

16. The method of claim 10, further comprising improving the set of potential awards for a limited period of time.

17. The method of claim 10, further comprising giving users an option to pay to improve the set of potential awards prior to presentation of the chance-based mini-game.

18. The method of claim 11, wherein the virtual item includes a status effect comprising at least one of increased attack damage, reduced opponent health points, and increased troops.

* * * * *